United States Patent
Calkins et al.

(10) Patent No.: US 10,656,048 B2
(45) Date of Patent: May 19, 2020

(54) REMOTELY CONTROLLED METHODS AND SYSTEMS FOR ACTUATING BOUNDARY LAYER TRANSITION DEVICES IN A WIND TUNNEL MODEL

(71) Applicant: The Boeing Company, Chicago, IL (US)

(72) Inventors: Frederick T. Calkins, Renton, WA (US); Dan J. Clingman, Miton, WA (US); Robert Griffiths, Seattle, WA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 15/474,714

(22) Filed: Mar. 30, 2017

(65) Prior Publication Data
US 2018/0283983 A1   Oct. 4, 2018

(51) Int. Cl.
| | |
|---|---|
| *G01M 9/02* | (2006.01) |
| *G01M 9/04* | (2006.01) |
| *G01M 9/08* | (2006.01) |
| *G01M 9/06* | (2006.01) |
| *H02N 2/02* | (2006.01) |

(52) U.S. Cl.
CPC ............... *G01M 9/02* (2013.01); *G01M 9/04* (2013.01); *G01M 9/06* (2013.01); *G01M 9/062* (2013.01); *G01M 9/065* (2013.01); *G01M 9/067* (2013.01); *G01M 9/08* (2013.01); *H02N 2/02* (2013.01)

(58) Field of Classification Search
CPC ............ G01M 9/02; G01M 9/04; G01M 9/06; G01M 9/065; G01M 9/067; G01M 9/062; G01M 9/08
See application file for complete search history.

(56) References Cited

U.S. PATENT DOCUMENTS

| | | | |
|---|---|---|---|
| 6,065,934 A | 5/2000 | Jacot et al. | |
| 6,322,324 B1 | 11/2001 | Kennedy et al. | |
| 6,453,669 B2 | 9/2002 | Kennedy et al. | |
| 6,499,952 B1 | 12/2002 | Jacot et al. | |
| 7,037,076 B2 | 5/2006 | Jacot et al. | |
| 7,753,316 B2 | 7/2010 | Larssen et al. | |
| 7,878,459 B2 | 2/2011 | Mabe et al. | |
| 8,469,315 B2 | 6/2013 | Larssen et al. | |
| 8,499,913 B2 | 8/2013 | Gunter | |
| 8,662,443 B2 | 3/2014 | Gunter et al. | |
| 8,726,652 B1 | 5/2014 | Gunter | |

(Continued)

*Primary Examiner* — Paul M. West
(74) *Attorney, Agent, or Firm* — Miller, Matthias & Hull LLP

(57) ABSTRACT

A system reproduces aerodynamic boundary layer transition conditions in a wind tunnel test environment under ambient to cryogenic temperature conditions. The system includes a test component disposed in the test environment that defines an exterior surface. A trip dot is mounted on the test component and has a first state, in which a distal surface of the trip dot is at a first elevation relative to the exterior surface of the test component, and a second state, in which the distal surface of the trip dot is at a second elevation relative to the exterior surface of the test component. An actuator is operably coupled to the trip dot and configured to transition the trip dot between first and second states. A controller remotely causes the actuator to transition the trip dot between the first and second states.

20 Claims, 6 Drawing Sheets

(56) References Cited

U.S. PATENT DOCUMENTS

| | | |
|---|---|---|
| 8,876,046 B2 | 11/2014 | Gunter et al. |
| 2007/0221789 A1 | 9/2007 | Lee |
| 2009/0179109 A1 | 7/2009 | Akkermann |
| 2010/0018322 A1 | 1/2010 | Neitzke |
| 2012/0060491 A1 | 3/2012 | Gunter |
| 2012/0325325 A1 | 12/2012 | Quackenbush |
| 2013/0298659 A1* | 11/2013 | Smith |
| 2015/0013445 A1 | 1/2015 | Kordt |
| 2016/0272302 A1* | 9/2016 | Rosenberger et al. |
| 2017/0003194 A1 | 1/2017 | Griffiths et al. |

* cited by examiner

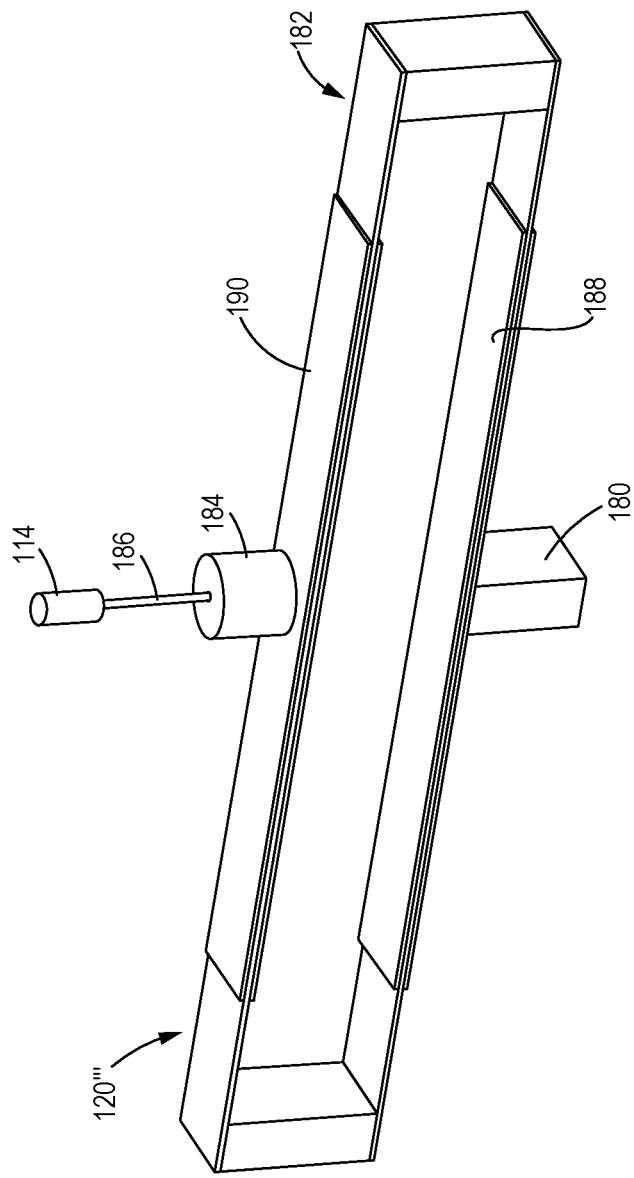
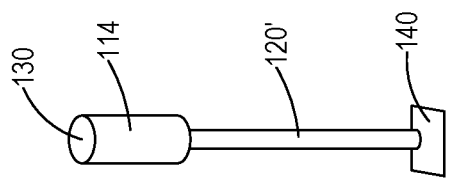
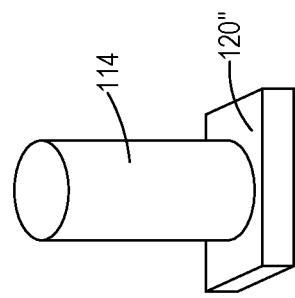

REMOTELY CONTROLLED METHODS AND SYSTEMS FOR ACTUATING BOUNDARY LAYER TRANSITION DEVICES IN A WIND TUNNEL MODEL

FIELD

The present disclosure generally relates to methods and systems for remotely controlling and remotely actuating components in a pressurized, cryogenic wind tunnel test environment from low to flight Reynolds number conditions to reproduce boundary layer transition conditions.

BACKGROUND

Wind tunnel models typically use movable control surfaces to efficiently simulate various control aspects of a vehicle being modeled. Unmotorized surfaces are often used due to their simplicity and ability to operate at extreme temperatures. However, such surfaces must be positioned by hand requiring interruption of testing to position the surfaces at desired control angles. Thus, existing solutions require removal and/or isolation of the model from the wind tunnel environment to make configuration changes.

Models are typically of reduced scale, and therefore, full size actuators which would be employed in actual vehicles are not readily adaptable for use. Various actuation systems have been employed in wind tunnel models including electromechanical actuators. However, electromechanical actuation is relatively bulky because of low power densities and the need for complex electric motor/gear assemblies. As such, the amount of space required in the supporting structure (for example, in a vertical tail of an aircraft) may limit the amount of instrumentation, such as pressure sensors, that can be installed in the model and may reduce structural strength which tends to limit their use to lower pressure tunnels having lower loads. Subscale models in lower pressure wind tunnels do not match the aerodynamic characteristics of a full scale aircraft as well, which limits their fidelity as design tools for testing aircraft configurations.

It is therefore desirable to provide an actuation system for use in models tested in harsh wind tunnel environments, or other temperature or load restricted applications, to improve wind tunnel test efficiency by reducing the number of times the wind tunnel is opened to complete model changes, while providing an actuator with sufficient force capability for cryogenic or higher pressure wind tunnels.

SUMMARY

The present disclosure generally relates to methods and systems for remotely controlling and remotely actuating components in a pressurized, cryogenic wind tunnel test environment from low to flight Reynolds number conditions to reproduce boundary layer transition conditions.

In accordance with one aspect of the present disclosure, a system is provided for reproducing aerodynamic boundary layer transition conditions in a wind tunnel test environment under ambient to cryogenic temperature conditions. The system includes a test component disposed in the wind tunnel test environment and defining an exterior surface. At least one trip dot is mounted on the test component and has a first state, in which a distal surface of the at least one trip dot is at a first elevation relative to the exterior surface of the test component, and a second state, in which the distal surface of the at least one trip dot is at a second elevation relative to the exterior surface of the test component. An actuator is operably coupled to the at least one trip dot and configured to transition the at least one trip dot between first and second states. A controller in communication with the actuator is configured to remotely cause the actuator to transition the at least one trip dot between the first and second states.

In accordance with another aspect of the present disclosure, a method is provided for remotely reproducing aerodynamic boundary layer transition conditions across a test component disposed in a wind tunnel test environment under ambient to cryogenic temperature conditions. The method includes causing an actuator to place at least one trip dot mounted on the test component in a first state, in which a distal surface of the at least one trip dot is at a first elevation relative to the exterior surface of the test component. A first wind tunnel test is performed on the test component with the at least one trip dot in the first state, and a first set of wind tunnel data is collected. The method further includes remotely transitioning, via the actuator, the at least one trip dot to a second state, in which the distal surface of the at least one trip dot is at a second elevation relative to the exterior surface of the test component. A second wind tunnel test is performed on the test component with the at least one trip dot in the second state, and a second set of wind tunnel data is collected.

In accordance with a further aspect of the present disclosure, a non-transitory computer readable medium is provided having stored thereon instructions that, upon being executed by a computing device, cause the computing device to perform functions including causing an actuator to place at least one trip dot mounted on a test component in a first state, in which a distal surface of the at least one trip dot is at a first elevation relative to the exterior surface of the test component, performing a first wind tunnel test on the test component with the at least one trip dot in the first state, and collecting a first set of wind tunnel data, remotely transitioning, via the actuator, the at least one trip dot to a second state, in which the distal surface of the at least one trip dot is at a second elevation relative to the exterior surface of the test component, and performing a second wind tunnel test on the test component with the at least one trip dot in the second state, and collecting a second set of wind tunnel data.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 3A is a schematic diagram of a trip dot having a shape memory alloy wire actuator.

FIG. 3B is a schematic diagram of a trip dot formed of shape memory alloy.

FIG. 3C is a schematic diagram of a piezoelectric actuator for a trip dot.

Figure 1:
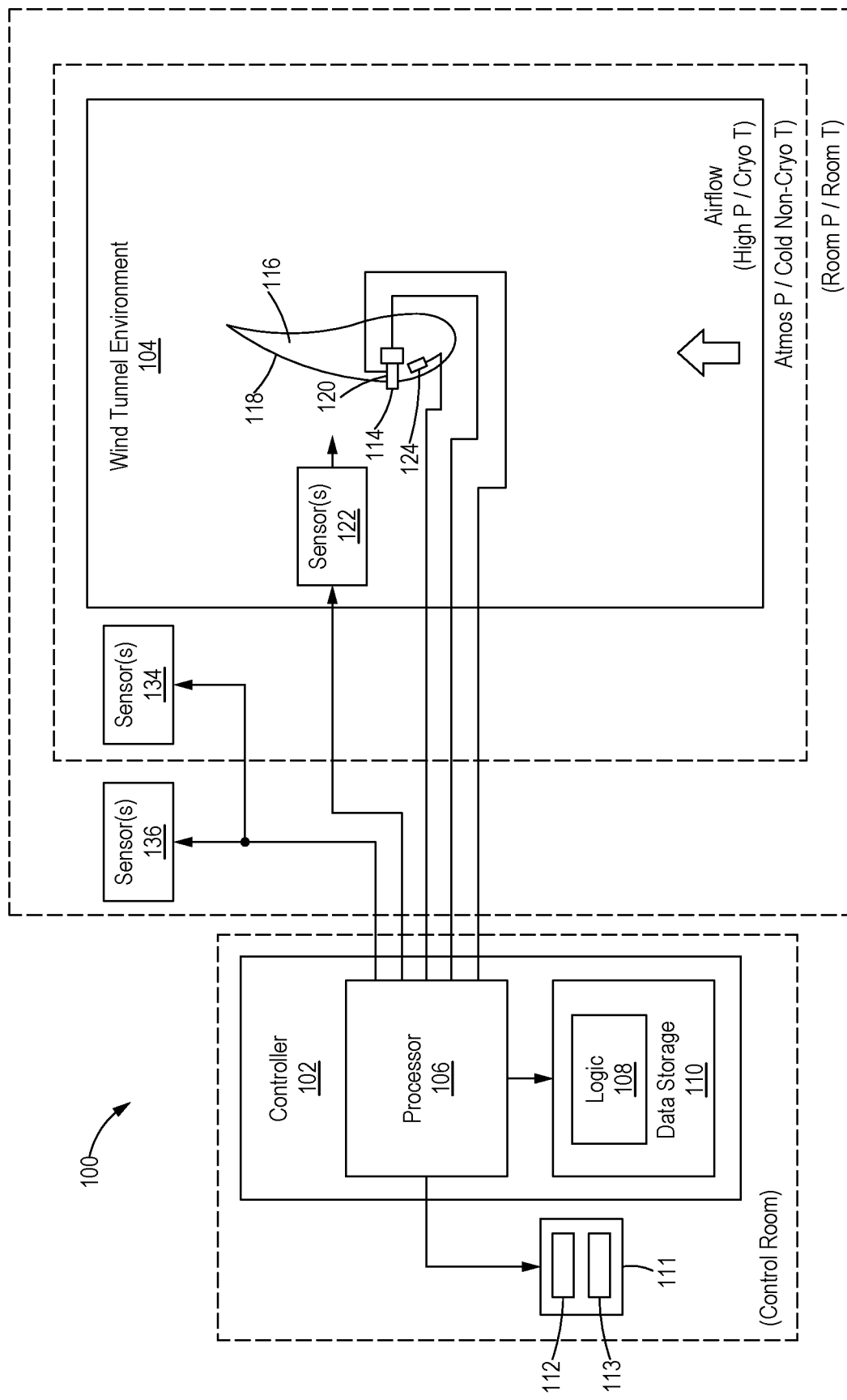
FIG. 1 is a schematic illustration of system for remotely controlling and remotely actuating components in a wind tunnel test environment under low pressure ambient temperature to high pressurized cryogenic temperature conditions (low to flight Reynolds number) to reproduce aerodynamic boundary layer transition conditions, according to an exemplary embodiment.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Wind tunnel testing for any given aircraft program is generally expensive due in large part to testing stoppage to make configuration changes. Traditional high pressure wind tunnels, which may provide up to 25%-30% flight Reynolds number for a subscale commercial transport model, are used for testing, and generally require approximately 30 minutes to make a single, simple configuration change of the aircraft. Other, more complex changes may require significantly longer time, such as on the order of several hours.

Cryogenic wind tunnels add a further complication due to the fact that such testing environments use large quantities of liquid nitrogen ($LN_2$) converted to gaseous nitrogen ($N_2$) under high pressure (e.g., up to 9 atmospheres) to create an environment having temperatures between about −250° F. to about 100° F. A benefit of cryogenic wind tunnels is their ability to obtain up to and including flight Reynolds number conditions by reproducing aerodynamic flight conditions with a sub-scale wind tunnel model. Acquiring up to flight Reynolds number aerodynamic data during aircraft testing enables risk reduction prior to developing final external (windswept) geometry or flight testing. Testing at less than flight Reynolds number requires use of artificial boundary layer transitions device, or "trips," sized for a specific Reynolds number. One traditional form of a boundary layer trip are small dots glued to the model surface, or "trip dots." However, the use of cryogenic, high pressure wind tunnels increases the amount of time required to make any configuration changes, including the application of a single trip dot. Further, due to their specialized nature, large cryogenic, pressurized wind tunnels are very few in number.

An ability to quickly and remotely move one or more trip dots provided on a component (e.g., aircraft part) while the aircraft (or other cryogenically tested device) is within an ambient to cryogenic environment is described below. A system is developed capable of adjusting the Reynolds number dependent trip dot height, which may be used for any device in simple to extreme environments, to reproduce appropriate aerodynamic boundary layer transition conditions.

Exemplary systems and methods are described for controllable and remote actuation of trip dot height on components subjected to extreme environments used during aircraft model testing. Remote actuation under ambient to cryogenic variable pressure conditions (such as high pressure environments for flight Reynolds number aircraft model testing) will help improve wind tunnel testing efficiency of aircraft components, as well as provide overall cost savings due to reduced model change time and decreased airplane performance risks.

In some exemplary embodiments, shape memory alloys (SMAs) or similar alloys may be used to facilitate actuation of the trip dots. Within examples using such SMAs, no removal or purging of the wind tunnel environment is necessary to reposition the trip dots. This reduces a threat of moisture entering the wind tunnel environment, and moisture measure in a range of about 1-2 ppm can cause test data results to be unreliable. Further, multiple more trip dot heights and configurations can be tested by dynamically re-configuring trip dot height and/or selectively deploying sub-sets of an array of trip dots, so that different boundary layer transition conditions are tested using real-time data results, rather than removing the model and risking contamination within the wind tunnel environment.

Referring now to the figures, FIG. 1 is a system 100 for remotely controlling and remotely actuating one or more trip dots in a wind tunnel test environment under ambient to cryogenic temperature conditions to reproduce aerodynamic boundary layer transition conditions, according to an exemplary embodiment. The system 100 includes a controller 102 that remotely controls operations of components in a wind tunnel environment 104. The controller includes a processor 106 that may execute logic 108 stored in data storage 110 to control the operations, and the controller 102 is in communication with a user interface 111 that may include a user input device 113 for inputting commands and a display 112 for displaying outputs representative of the operations and test results.

The controller 102 may be representative of any kind of computing device or controller, or may be a portion of another apparatus as well, such as an apparatus included entirely within a server and portions of the controller 102 may be elsewhere or located within other computing devices. The controller 102 may be included within a control room that is separate from the wind tunnel environment 104, or segregated from the wind tunnel environment 104 by enclosures that seal the wind tunnel environment 104.

The wind tunnel environment 104 is a testing environment with controlled temperatures and pressures. A test component 116 may be placed inside the wind tunnel environment 104 for testing. Within examples, the test component 116 includes at least one exterior surface 118, at least one trip dot 114 coupled to and movable relative to the exterior surface 118, and an actuator 120 configured to actuate the at least one trip dot 114.

The test component 116 may be a component of an aircraft, such as a wing of an aircraft. The test component 116 may be numerous other components of an aircraft or other flight control surfaces, such as an aileron, slats, spoilers, flaperons, winglets, rudders, elevators, propellers, stabilizers, landing gear mechanisms, inlet and nozzle movements, trim tabs, etc. The test component 116 may still be other numerous components of other vehicles or non-vehicles as well that operate in extreme temperature conditions and testing of such components can occur in the wind tunnel environment.

In addition, sensors 122 are provided inside the wind tunnel environment 104 to detect and output information related to testing of the test component 116. For example, the sensors 122 may include pressure or temperature sensors to provide information representative of a pressure or a temperature in the wind tunnel environment 104. Furthermore, additional sensor(s) 124 may be provided within the test component 116, such as additional temperature or pressure sensors, so as to provide temperature and pressure of an interior of the test component 116.

In some embodiments, the actuator 120 is operably coupled to the processor 106, thereby to control actuation of the actuator 120 and/or trip dots 114. The processor 106 of the controller 102 is in communication with the actuator 120 and the sensors 122 and 124, and is configured to remotely cause the actuator 120 to move the at least one trip dot 114, thereby to test the test component 116 in the wind tunnel environment 104.

As shown in FIG. 1, the wind tunnel environment 104 may provide ambient to cryogenic temperature conditions by using liquid nitrogen ($LN_2$) converted to gaseous nitrogen ($N_2$) under high pressure (e.g., up to 9 atmospheres) to create an environment having temperatures in a range of about −250° F. to about 100° F. Such high pressures and low temperatures simulate actual flight conditions of an aircraft, for example. Thus, the region shown in FIG. 1 outlined by the wind tunnel environment 104 may be the high pressure and cryogenic temperature region of the wind tunnel in which wind is blowing over the test component 116 to simulate the flight conditions.

Surrounding the wind tunnel environment 104, a second region includes the pressure dropping (e.g., such as to atmospheric pressure) and the temperature increasing to noncryogenic temperatures (e.g., such as to 0° F. or higher). Areas marked surrounding the wind tunnel environment 104 in FIG. 1 may still be within an enclosed area for the wind tunnel, but illustrate that the high pressure/cryogenic temperature region may be focused on the component undergoing testing. Further, outside of this second region, the pressure drops further to room pressures (e.g., 1 atm) and the temperature increases to room temperature (e.g., 60° F. to 80° F.).

Trip dots having static heights require manual positioning or replacement by hand, which necessitates interruption of testing to position the trip dots having desired heights. The system 100 in FIG. 1 enables testing of components at actual flight Reynolds number and cryogenic conditions through remote actuation. The actuator 120 enables remote control of the trip dots 119 in a cryogenic environment. Remote control and actuation further enables testing of many different trip dot heights, as well as different configurations of trip dot series and arrays, in far less time.

The system 100 in FIG. 1 illustrates the sensors 122 and 124, and more sensors may be included as well, such as a plurality of data sensors for providing data indicative of one or more conditions in the wind tunnel environment 104 including additional temperature sensors or pressure sensors. The controller 102 may be in communication with the additional sensors as well.

As an example, additional sensors may include wind tunnel calibration sensors 134 and 136 positioned within the different regions of the wind tunnel environment 104 so that combined with the sensor 122, characteristics of all regions of the wind tunnel environment 104 can be determined. Each of the sensors 122, 134, and 136 are coupled to the processor 106 and can output temperature, pressure, wind flow velocity, etc. to the processor 106 for determination of baseline characteristics of the wind tunnel environment 104 prior to testing. Since the wind tunnel environment 104 is a testing environment with controlled temperatures and pressures, such calibration sensors 134 and 136 are helpful to provide baseline of the system 100 before operational testing to characterize heat mass flow rates of the system 100. Example baseline characteristics to determine include a temperature and pressure on the test component 116 before and after testing, and temperatures and pressures in all regions of the wind tunnel environment 104 before and after testing.

Further, although shown as direct communication lines or wired communication in FIG. 1, the controller 102 may be in wired and/or wireless communication with any of the components including the actuator 120 and the sensors 122 and 124 of the system 100.

Figure 2A:
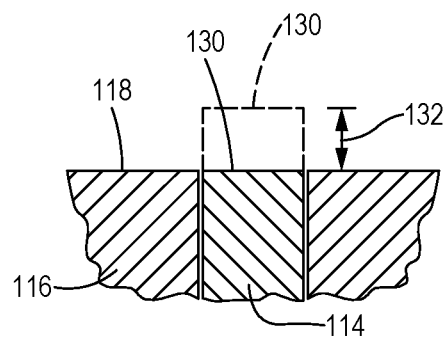
FIG. 2A is a side elevation view, in cross-section, of a trip dot used in the system of FIG. 1, with the trip dot in a first state.
Figure 2B:
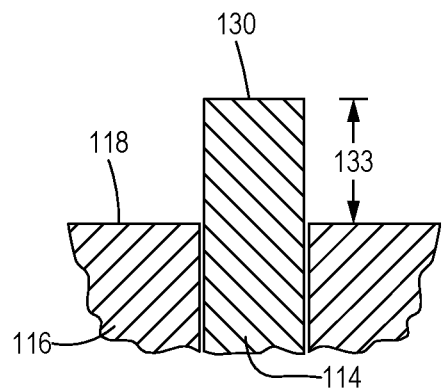
FIG. 2B is a side elevation view, in cross-section, of the trip dot of FIG. 2A in a second state.

As best shown in FIGS. 2A and 2B, the at least one trip dot 114 is configurable between at least first and second states, thereby to simulate different boundary layer conditions when testing the test component 116 in the wind tunnel environment 104. In FIG. 2A, the trip dot 114 is shown in the first state, in which a distal surface 130 of the trip dot 114 is at a first elevation relative to the exterior surface 118 of the test component 116. As illustrated in FIG. 2A, the distal surface 130 at the first elevation may be flush with the exterior surface 118 of the test component 116. Alternatively, as shown in phantom in FIG. 2A, the distal surface 130 at the first elevation may be a first height 132 above the exterior surface 118. When the trip dot 114 is configured in the second state, the distal surface 130 is at a second elevation, different from the first elevation, relative to the exterior surface 118 of the test component 116. As best shown in FIG. 2B, the distal surface 130 at the second elevation is at a second height 133 that is greater than the first height 132. Each of the heights of the trip dots 114 may be selected to ensure boundary layer separation at a particular set of wind tunnel conditions. Thus, by providing a trip dot 114 that is configurable between different states, the system 100 may alter boundary layer air flow patterns over the exterior surface 118, thereby to simulate different flight conditions.

Figure 2C:
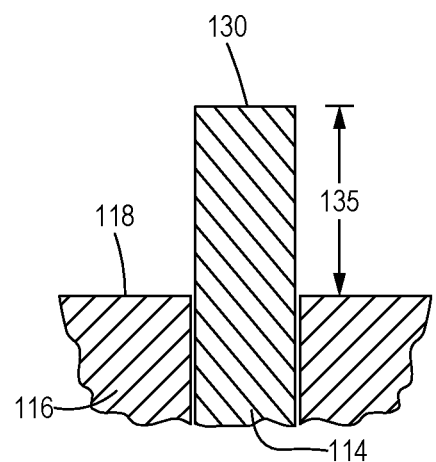
FIG. 2C is a side elevation view, in cross-section, of the trip dot of FIGS. 2A and 2B in a third state.

It will be appreciated that, in some embodiments, the trip dot 114 is configurable in more than two states. For example, as best shown in FIG. 2C, the trip dot 114 may have a third state, in which the distal surface 130 is placed at a third elevation relative to the exterior surface 118 of the test component 116, in this example at a third height 135 above the exterior surface 118. Still further, while not specifically illustrated herein, the trip dot 114 may have yet additional states with corresponding heights of the distal surface 130 beyond three.

The actuator 120 is operably coupled to the at least one trip dot 114 and is configured to transition the at least one trip dot 114 between first and second states. In some embodiments, the actuator is provided as a separate component that is mechanically coupled to the trip dot 114. For example, the actuator 120' shown in FIG. 3A is a wire formed of shape memory alloy (SMA) that changes length according to temperature. The actuator 120' has a first end coupled to the trip dot 114, and a second end coupled to a heat source 140. The heat source may be a heater, an electrical wire, or any other component capable of delivering a sufficient amount of heat to change the length of the shape memory alloy actuator 120'. The controller 102 is operably coupled to the heat source 140 to control the amount of heat delivered to the actuator 120', thereby to remotely transition the at least one trip dot 114 between the first and second states. The heat control scheme may be open loop, or may be closed loop based on feedback from one or more of the sensors 122, 124. A dedicated actuator 120' may be provided for each trip dot 114, or the actuator 120' may mechanically engage multiple trip dots 114.

In an alternative embodiment, the at least one trip dot 114 is itself formed of SMA material. In this embodiment, an actuator 120" is provided as a heat source thermally coupled to the trip dot 114, as shown in FIG. 3B. Similar to the embodiment of FIG. 3A described above, the controller 102 may be operably coupled to the actuator 120" to control the temperature, and thus the length, of the trip dot 114.

The SMAs noted above form a group of metals that have useful thermal and mechanical properties. As an example, an SMA material such as Nitinol may be deformed while in a martensitic state (low yield strength condition) and then heated to its transition temperature to reach an austenitic state, so that the SMA material will resume its austenitic shape. A rate of return to the austenitic shape depends upon an amount and rate of thermal energy applied to the SMA. SMA actuators are useful in a wide variety of contexts, including aircraft-related contexts, to actuate particular devices.

The SMA components described herein may be formed from any suitable material and/or may include any suitable material (or materials) of construction. As illustrative, non-exclusive examples, the SMA component(s) may include hafnium, palladium, platinum, copper, aluminum, nickel, titanium, zinc, gold, and/or iron. As a more specific but still illustrative, non-exclusive example, the SMA component(s) comprise a nickel and titanium alloy that exists in a martensite phase at (relatively) lower temperatures and in an austenite phase at (relatively) higher temperatures. In a particular example, the SMA can be 55% by weight nickel and 45% by weight titanium. In a further example, the SMA can have an equi-atomic composition, with 50% nickel molecules and 50% titanium molecules. Other suitable materials for SMAs include nickel/titanium alloys with additional constituents (e.g., palladium and/or platinum) to increase a transition temperature, and/or to attain other material properties.

In a further embodiment, a piezoelectric actuator 120''' may be used to configure the at least one trip dot 114 between states, as best shown in FIG. 3C. The piezoelectric actuator 120''' includes a base 180, a bimorph assembly 182, a connector 184, and a pin 186. The bimorph assembly 182 includes a first bimorph beam 188 coupled to the base 180 and a second bimorph beam 190 coupled to the connector 184. The first and second bimorph beams 188, 190 are formed of a piezoelectric material that generates stress when an electric field is applied. Accordingly, the first and second bimorph beams 188, 190 bend in response to applied voltage, thereby to change the distance between the base 180 and the connector 184. The pin 186 is coupled between the connector 184 and the trip dot 114, so that bending of the first and second bimorph beams 188, 190 will transition the trip dot 114 between states.

In some embodiments, the sensor 124 may be configured to provide trip dot position information, thereby to facilitate closed loop control of trip dot height. For example, the sensor 124 may be provided as a position sensor configured to detect a location of the distal surface 130 relative to the exterior surface 118 of the test component 116 and send feedback to the controller 102. In some embodiments, the controller 102 is configured to manage power provided to the actuator 120 thereby to transition the at least one trip dot between first and second states.

Figure 4A:
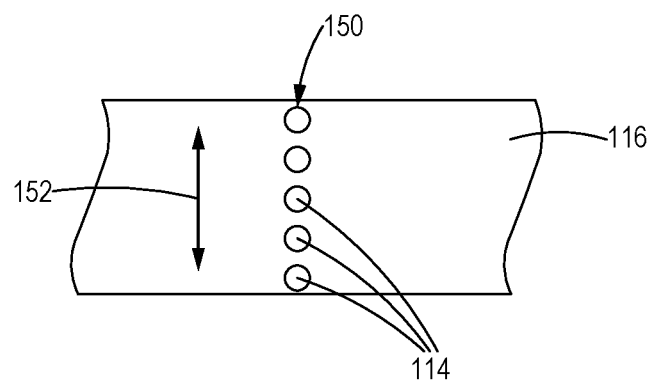
FIG. 4A is a schematic diagram of a series of trip dots aligned in a chordwise direction.
Figure 4B:
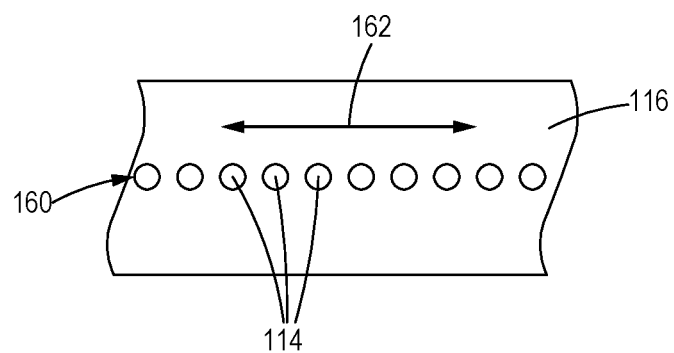
FIG. 4B is a schematic diagram of a series of trip dots aligned in a spanwise direction.
Figure 4C:
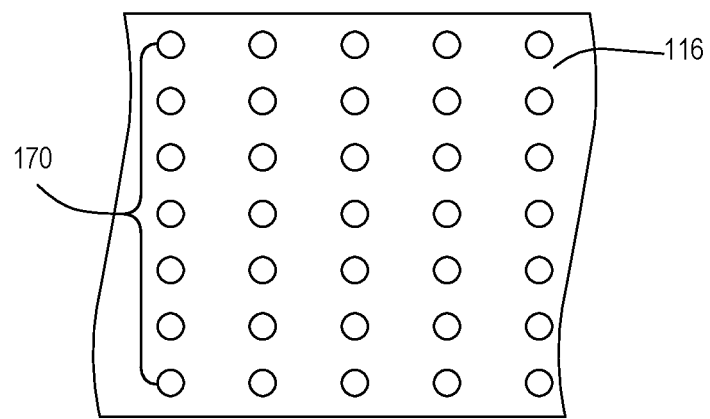
FIG. 4C is a schematic diagram of an array of trip dots including multiple chordwise and spanwise series of trip dots.

For embodiments having multiple trip dots 114, the trip dots 114 may be arranged in any one of several different patterns. For example, as shown in FIG. 4A, a series 150 of trip dots 114 may be aligned with a chordwise direction 152 defined by the test component 116. Alternatively, a series 160 of trip dots 114 may be aligned with a spanwise direction 162 defined by the test component 116, as shown in FIG. 4B. Still further, as shown in FIG. 4C, an array 170 of trip dots 114 may be provided that includes multiple series of trip dots 114 at different spanwise and chordwise locations of the test component 116. In embodiments having multiple trip dots 114, the controller 102 may be configured to selectively actuate individual trip dots 114, or a sub-set of trip dots 114, to move between states.

Figure 5:
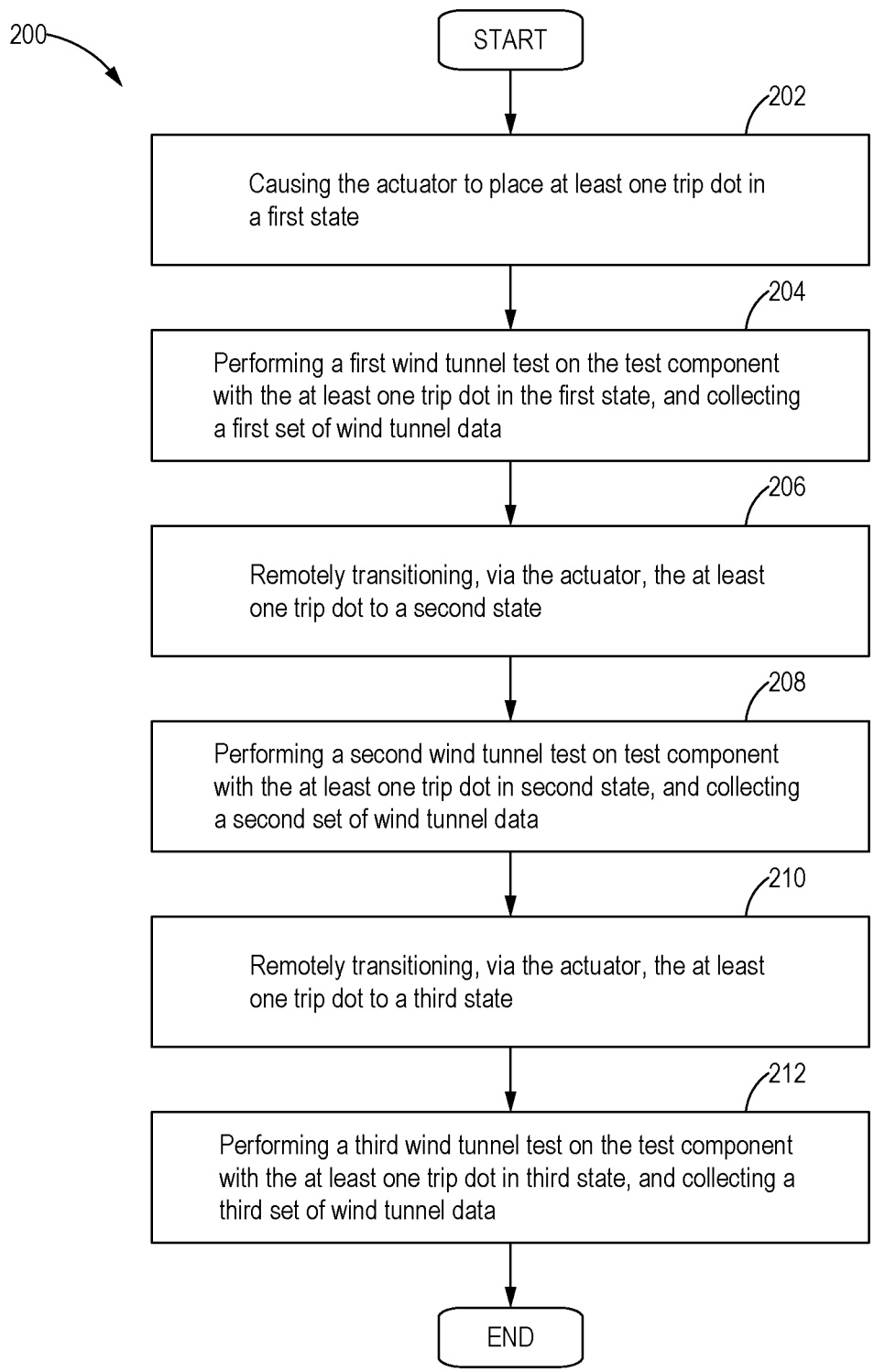
FIG. 5 is a flow illustrating an exemplary method for remotely reproducing aerodynamic boundary layer transition conditions in a wind tunnel test environment under low pressure ambient temperature to high pressurized cryogenic temperature conditions.

FIG. 5 shows a flowchart of an example method 200 for remotely reproducing aerodynamic boundary layer transition conditions in a wind tunnel test environment under ambient to cryogenic temperature conditions, according to an example embodiment. Method 200 shown in FIG. 5 presents an embodiment of a method that, for example, could be used with the system shown in FIG. 1, for example and may be performed by a computing device (or components of a computing device) such as a client device or a server or may be performed by components of both a client device and a server. Example devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 20X-20Y. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 5 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes causing, via energy transduction such as from thermal, electrical, magnetic, chemical, pneumatic, or hydraulic-to-mechanical actuation, the actuator 120 to place at least one trip dot 114 mounted on the test component 116 in a first state. When in the first state, the distal surface 130 of the at least one trip dot 114 is positioned at a first elevation relative to the exterior surface 118 of the test component 116. The actuator 120 is operably coupled to the at least one trip dot 114. In some embodiments, the actuator 120 comprises shape memory alloy (SMA) wires that are thermally actuated to cause movement of the at least one trip dot 114.

At block 204, the method 200 includes performing a first wind tunnel test on the test component 116 with the at least one trip dot 114 in the first state, and collecting a first set of wind tunnel data. The first set of wind tunnel data may be collected by one or more of the sensors 122, 124, 134, 136 and communicated to the controller 102, where it may be stored in the data storage 110.

At block 206, the method 200 includes remotely transitioning, via the actuator 120, the at least one trip dot 114 to a second state. When in the second state, the distal surface 130 of each trip dot 114 is positioned at a second elevation relative to the exterior surface 118 of the test component 116. The second elevation is different than the first elevation. For example, the first elevation is a first height 132 (FIG. 2A) above the exterior surface 118 of the test component 116, while the second elevation is a second height 133 (FIG. 2B) above the exterior surface 118.

At block 208, the method 200 includes performing a second wind tunnel test on the test component 116 with the at least one trip dot 114 in the second state, and collecting a second set of wind tunnel data. The second set of wind tunnel data may be collected by one or more of the sensors 122, 124, 134, 136 and communicated to the controller 102, where it may be stored in the data storage 110. Because the trip dots 114 have different elevations relative to the exterior surface 118 in the first and second states, the second set of wind tunnel data will be different than the first set of wind tunnel data. Accordingly, the method permits remotely changing boundary layer separation conditions, avoiding downtime, purging, replacement of trip dots, or other steps conventionally required between first and second tests.

At block 210, the method 200 may optionally include remotely transitioning, via the actuator, the at least one trip dot 114 to a third state. When in the third state, the distal surface 130 of each trip dot 114 is positioned at a third elevation relative to the exterior surface 118 of the test component 116. The third elevation may be a third height 135 (FIG. 2C) above the exterior surface 118 that is different than the first and second heights 132, 133.

At block 212, the method 200 may optionally include performing a third wind tunnel test on the test component 116 with the at least one trip dot 114 in the third state, and collecting a third set of wind tunnel data. The third set of wind tunnel data may be collected by one or more of the sensors 122, 124, 134, 136 and communicated to the controller 102, where it may be stored in the data storage 110.

Figure 6:
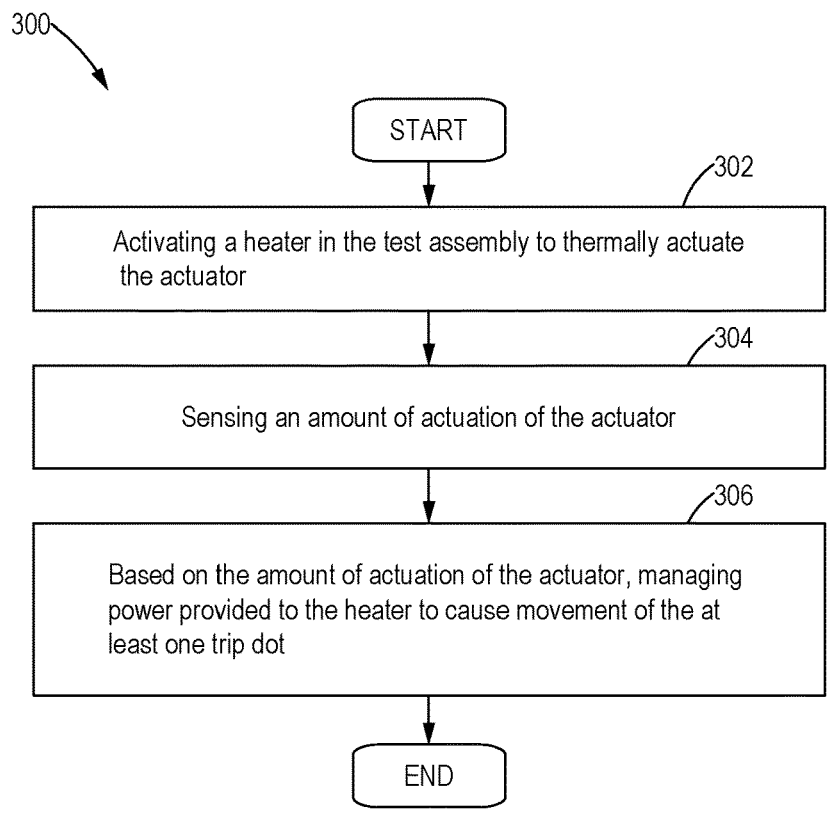
FIG. 6 is a flow chart illustrating an exemplary method for activating and managing a heat source used to actuate a trip dot between states.

Within further examples, additional methods may be performed in combination with the method 200. For instance, FIG. 6 shows a flowchart of an example method 300 for activating and managing the heat source 140, according to an example embodiment. At block 302, the method 300 includes activating a heat source 140 in the test system 100 to thermally actuate the actuator 120. At block 304, the method 300 includes sensing an amount of actuation of the actuator 120 (e.g., such as an amount of deflection). An amount of actuation by the actuator 120 can be sensed by a strain gauge (e.g., determining twist of an SMA). At block 306, the method 300 includes, based on the amount of actuation of the actuator 120, managing power provided to the heat source 140 to cause movement of the at least one trip dot 114 between first and second states.

Examples herein are described with respect to testing aircraft components in a wind tunnel environment. Other testing uses may be beneficial as well, such as for testing of deep underwater vehicle systems, or other vehicles and/or surface interaction that may be exposed to cryogenic conditions.

Figure 7:
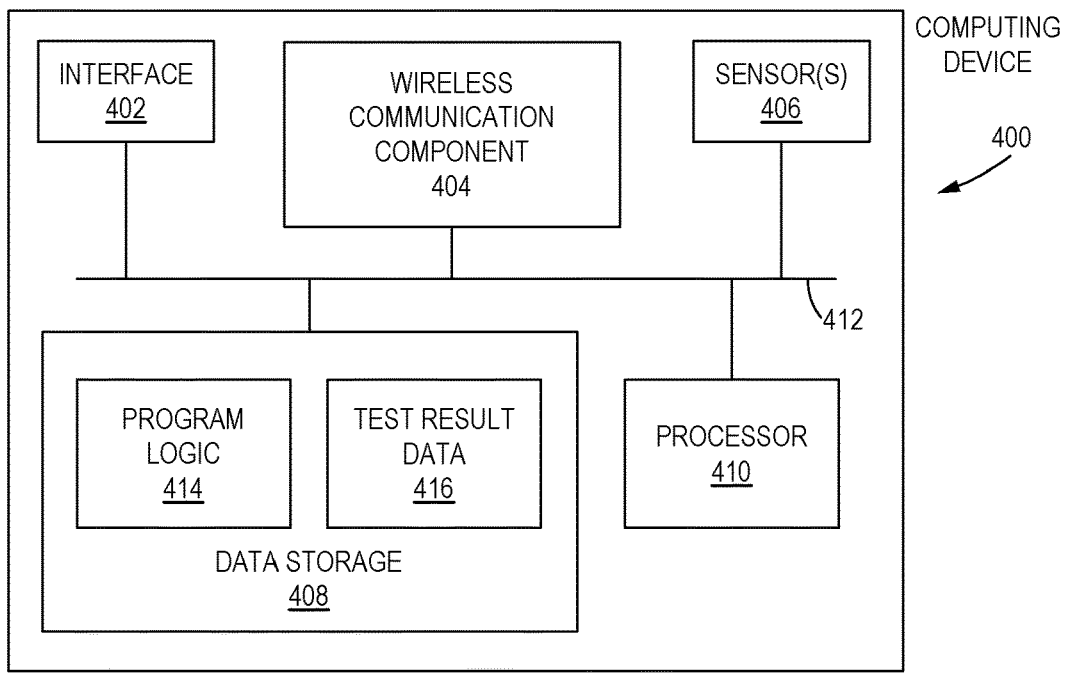
FIG. 7 is a schematic illustration of a computing device according to an exemplary embodiment.

As mentioned, portions of any of the methods described herein (e.g., the method 200) may be performed by a computing device (or components of a computing device), as well as by components of elements shown in FIG. 1. FIG. 7 illustrates a schematic drawing of an example computing device 400, according to an example embodiment. The computing device 400 in FIG. 7 may represent devices shown in FIG. 1 including the processors or the controller, or any of the blocks conceptually illustrating computing components, or the computing device 400 may represent a device for performing functions of the system in FIG. 1 in general. In some examples, some components illustrated in FIG. 7 may be distributed across multiple computing devices. However, for the sake of example, the components are shown and described as part of one example device 400. The computing device 400 may be or include a mobile device, desktop computer, email/messaging device, tablet computer, or similar device that may be configured to perform the functions described herein.

The computing device 400 may include an interface 402, a wireless communication component 404, sensor(s) 406, data storage 408, and a processor 410. Components illustrated in FIG. 7 may be linked together by a communication link 412. The computing device 400 may also include hardware to enable communication within the computing device 400 and between the computing device 400 and another computing device (not shown), such as a server entity. The hardware may include transmitters, receivers, and antennas, for example.

The interface 402 may be configured to allow the computing device 400 to communicate with another computing device (not shown), such as a server. Thus, the interface 402 may be configured to receive input data from one or more computing devices, and may also be configured to send output data to the one or more computing devices. In some examples, the interface 402 may also maintain and manage records of data received and sent by the computing device

400. The interface 402 may also include a receiver and transmitter to receive and send data. In other examples, the interface 402 may also include a user-interface, such as a keyboard, microphone, touchscreen, etc., to receive inputs as well.

The wireless communication component 404 may be a communication interface that is configured to facilitate wireless data communication for the computing device 400 according to one or more wireless communication standards. For example, the wireless communication component 404 may include a Wi-Fi communication component that is configured to facilitate wireless data communication according to one or more IEEE 802.11 standards. As another example, the wireless communication component 404 may include a Bluetooth communication component that is configured to facilitate wireless data communication according to one or more Bluetooth standards. Other examples are also possible.

The sensor 406 may include one or more sensors, or may represent one or more sensors included within the computing device 400. Example sensors include an accelerometer, gyroscope, pedometer, light sensors, microphone, camera, temperature, pressure, or other location and/or context-aware sensors.

The data storage 408 may store program logic 414 that can be accessed and executed by the processor 410. The data storage 408 may also store collected sensor data or test result data 416.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure. Various modifications, as are suited to the particular use, are contemplated.

What is claimed is:

1. A system for reproducing aerodynamic boundary layer transition conditions in a wind tunnel test environment under ambient to cryogenic temperature conditions, the system comprising:
    a test component disposed in the wind tunnel test environment and defining an exterior surface;
    at least one trip dot mounted on the test component and having a first state, in which a distal surface of the at least one trip dot is at a first elevation relative to the exterior surface of the test component, and a second state, in which the distal surface of the at least one trip dot is at a second elevation relative to the exterior surface of the test component;
    an actuator operably coupled to the at least one trip dot and configured to transition the at least one trip dot between first and second states, wherein the actuator comprises a shape memory alloy wire mechanically coupled to the at least one trip dot and a heat source thermally coupled to the shape memory alloy wire; and
    a controller in communication with the actuator and configured to remotely cause the actuator to transition the at least one trip dot between the first and second states.

2. The system of claim 1, further comprising a position sensor operably coupled to the controller and configured to determine a position of the at least one trip dot.

3. The system of claim 1, in which the distal surface of the at least one trip dot is flush with the exterior surface of the test component when the at least one trip dot is in the first state, and in which the distal surface of the at least one trip dot is at a height above the exterior surface of the test component when the at least one trip dot is in the second state.

4. The system of claim 1, in which the distal surface of the at least one trip dot is at a first height above the exterior surface of the test component when the at least one trip dot is in the first state, and in which the distal surface of the at least one trip dot is at a second height above the exterior surface of the test component when the at least one trip dot is in the second state.

5. The system of claim 1, in which the at least one trip dot has a third state, in which the distal surface of the at least one trip dot is at a third elevation relative to the exterior surface of the test component.

6. The system of claim 1, in which the at least one trip dot comprises a series of trip dots aligned along a chordwise direction of the test component.

7. The system of claim 1, in which the at least one trip dot comprises an array trip dots positioned at different chordwise and spanwise locations of the test component.

8. The system of claim 1, in which the controller wirelessly communicates with the actuator.

9. The system of claim 1, further comprising a data sensor to sense an amount of actuation of the actuator, and in which the controller receives an output of the data sensor and manages power provided to the actuator to transition the at least one trip dot between first and second states.

10. A system for reproducing aerodynamic boundary layer transition conditions in a wind tunnel test environment under ambient to cryogenic temperature conditions, the system comprising:
    a test component disposed in the wind tunnel test environment and defining an exterior surface;
    at least one trip dot mounted on the test component and having a first state, in which a distal surface of the at least one trip dot is at a first elevation relative to the exterior surface of the test component, and a second state, in which the distal surface of the at least one trip dot is at a second elevation relative to the exterior surface of the test component;
    an actuator operably coupled to the at least one trip dot and configured to transition the at least one trip dot between first and second states; and
    a controller in communication with the actuator and configured to remotely cause the actuator to transition the at least one trip dot between the first and second states;
    wherein the at least one trip dot is formed of a shape memory alloy, and in which the actuator comprises a heat source thermally coupled to the at least one trip dot.

11. The system of claim 10, in which the at least one trip dot has a third state, in which the distal surface of the at least one trip dot is at a third elevation relative to the exterior surface of the test component.

12. A method for remotely reproducing aerodynamic boundary layer transition conditions across a test component disposed in a wind tunnel test environment under ambient to cryogenic temperature conditions, the method comprising:

causing an actuator to place at least one trip dot mounted on the test component in a first state, in which a distal surface of the at least one trip dot is at a first elevation relative to the exterior surface of the test component;

performing a first wind tunnel test on the test component with the at least one trip dot in the first state, and collecting a first set of wind tunnel data;

remotely transitioning, via the actuator, the at least one trip dot to a second state, in which the distal surface of the at least one trip dot is at a second elevation relative to the exterior surface of the test component; and performing a second wind tunnel test on the test component with the at least one trip dot in the second state, and collecting a second set of wind tunnel data;

wherein the at least one trip dot is formed of a shape memory alloy and the actuator comprises a heat source thermally coupled to the at least one trip dot, and in which remotely transitioning the at least one trip dot to the second state comprises changing a temperature of the heat source.

13. The method of claim 12, in which the distal surface of the at least one trip dot is at a first height above the exterior surface of the test component when the at least one trip dot is in the first state, and in which the distal surface of the at least one trip dot is at a second height above the exterior surface of the test component when the at least one trip dot is in the second state.

14. The method of claim 13, further comprising:
remotely transitioning, via the actuator, the at least one trip dot to a third state, in which the distal surface of the at least one trip dot is at a third elevation relative to the exterior surface of the test component; and performing a third wind tunnel test on the test component with the at least one trip dot in the third state, and collecting a third set of wind tunnel data.

15. The method of claim 14, in which a heat sensitive actuator is coupled to the at least one trip dot and a data sensor is configured to sense an amount of actuation of the actuator, and in which remotely transitioning the at least one trip dot to the second state comprises managing power provided to the actuator based an output of the data sensor.

16. A method for remotely reproducing aerodynamic boundary layer transition conditions across a test component disposed in a wind tunnel test environment under ambient to cryogenic temperature conditions, the method comprising:
causing an actuator to place at least one trip dot mounted on the test component in a first state, in which a distal surface of the at least one trip dot is at a first elevation relative to the exterior surface of the test component;

performing a first wind tunnel test on the test component with the at least one trip dot in the first state, and collecting a first set of wind tunnel data;

remotely transitioning, via the actuator, the at least one trip dot to a second state, in which the distal surface of the at least one trip dot is at a second elevation relative to the exterior surface of the test component; and performing a second wind tunnel test on the test component with the at least one trip dot in the second state, and collecting a second set of wind tunnel data;

wherein the actuator comprises a shape memory alloy wire mechanically coupled to the at least one trip dot and a heat source thermally coupled to the shape memory alloy wire, and in which remotely transitioning the at least one trip dot to the second state comprises changing a temperature of the heat source.

17. A non-transitory computer readable medium having stored thereon instructions that, upon being executed by a computing device, cause the computing device to perform functions comprising:
causing an actuator to place at least one trip dot mounted on a test component in a first state, in which a distal surface of the at least one trip dot is at a first elevation relative to the exterior surface of the test component;

performing a first wind tunnel test on the test component with the at least one trip dot in the first state, and collecting a first set of wind tunnel data;

remotely transitioning, via the actuator, the at least one trip dot to a second state, in which the distal surface of the at least one trip dot is at a second elevation relative to the exterior surface of the test component; and performing a second wind tunnel test on the test component with the at least one trip dot in the second state, and collecting a second set of wind tunnel data;

wherein the at least one trip dot is formed of a shape memory alloy and the actuator comprises a heat source thermally coupled to the at least one trip dot, and in which remotely transitioning the at least one trip dot to the second state comprises changing a temperature of the heat source.

18. The non-transitory computer readable medium of claim 17, in which the instructions further cause the computing device to:
remotely transition, via the actuator, the at least one trip dot to a third state, in which the distal surface of the at least one trip dot is at a third elevation relative to the exterior surface of the test component; and perform a third wind tunnel test on the test component with the at least one trip dot in the third state, and collecting a third set of wind tunnel data.

19. A non-transitory computer readable medium having stored thereon instructions that, upon being executed by a computing device, cause the computing device to perform functions comprising:
causing an actuator to place at least one trip dot mounted on a test component in a first state, in which a distal surface of the at least one trip dot is at a first elevation relative to the exterior surface of the test component;

performing a first wind tunnel test on the test component with the at least one trip dot in the first state, and collecting a first set of wind tunnel data;

remotely transitioning, via the actuator, the at least one trip dot to a second state, in which the distal surface of the at least one trip dot is at a second elevation relative to the exterior surface of the test component; and performing a second wind tunnel test on the test component with the at least one trip dot in the second state, and collecting a second set of wind tunnel data;

wherein the actuator comprises a shape memory alloy wire mechanically coupled to the at least one trip dot and a heat source thermally coupled to the shape memory alloy wire, and in which remotely transitioning the at least one trip dot to the second state comprises changing a temperature of the heat source.

20. The non-transitory computer readable medium of claim 19, in which the instructions further cause the computing device to:
remotely transition, via the actuator, the at least one trip dot to a third state, in which the distal surface of the at least one trip dot is at a third elevation relative to the exterior surface of the test component; and perform a third wind tunnel test on the test component with the at least one trip dot in the third state, and collecting a third set of wind tunnel data.

* * * * *

UNITED STATES PATENT AND TRADEMARK OFFICE
CERTIFICATE OF CORRECTION

| | | |
|---|---|---|
| PATENT NO. | : 10,656,048 B2 | Page 1 of 1 |
| APPLICATION NO. | : 15/474714 | |
| DATED | : May 19, 2020 | |
| INVENTOR(S) | : Frederick T. Calkins et al. | |

It is certified that error appears in the above-identified patent and that said Letters Patent is hereby corrected as shown below:

In the Claims

At Column 13, Line 29, delete the number "13" and substitute therefore -- 12 --.

At Column 13, Line 38, delete the number "14" and substitute therefore -- 12 --.

Signed and Sealed this
Twenty-fifth Day of August, 2020

Andrei Iancu
*Director of the United States Patent and Trademark Office*